3,106,287
TROUGHING ROLLER ASSEMBLY
Ralph F. Risse, Chicago, Ill., assignor to Goodman Manufacturing Company, Chicago, Ill., a corporation of Illinois
Filed Dec. 27, 1961, Ser. No. 162,402
9 Claims. (Cl. 198—192)

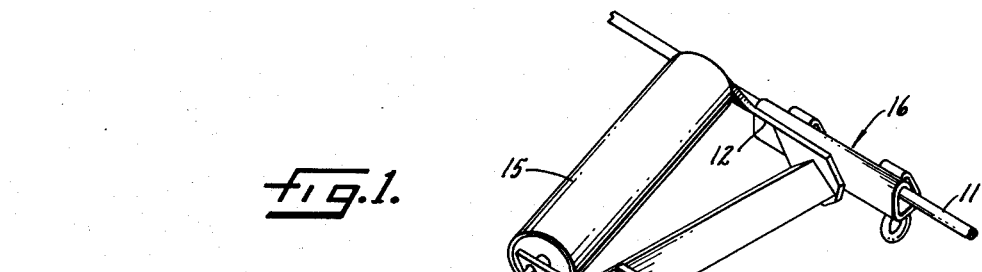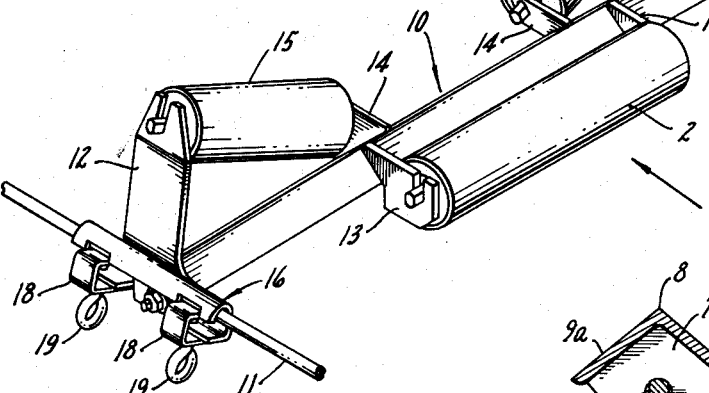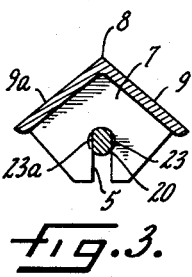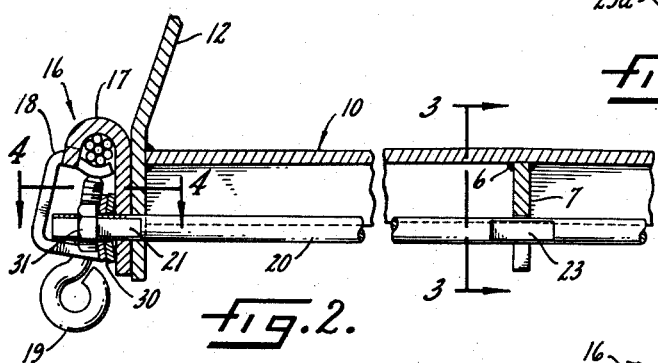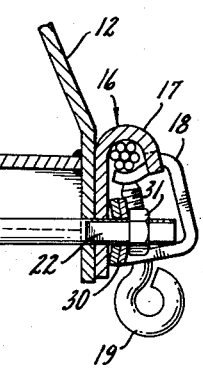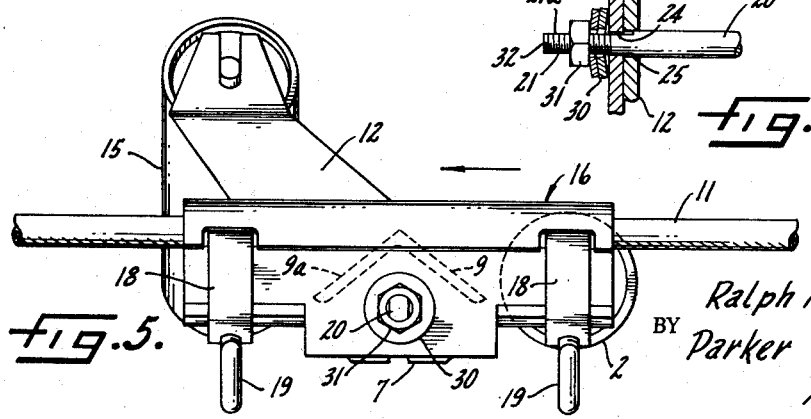
INVENTOR.
Ralph F. Risse,
BY Parker & Carter
Attorneys.

This invention relates to troughing idler assemblies for wire rope sideframe conveyors, in particular, to an improved yieldable troughing idler assembly.

An object of this invention is to provide a basically rigid troughing idler assembly which can yield under impact load.

Another object of this invention is a troughing idler assembly which can return to its original position following the passage of an impact load.

Another object is a troughing idler assembly wherein downstream tilting of said assembly is resisted by a torque bar.

Another object is a troughing idler assembly having a crosspiece and torque bar combination providing a favorable strength-to-weight ratio.

Another object is a troughing idler assembly wherein downstream tilting is limited, and the idler assembly resumes its original position following such tilting.

Another object is a troughing idler assembly wherein the torque bar is biased by springs adapted to restore the torque bar and assembly to its original position following impact load.

Another object is a troughing idler assembly having a torque bar which is keyed into the assembly at spaced positions to limit downstream tilting of said assembly.

Another object is a troughing idler assembly having an angular crosspiece which coacts with a torque bar to resist tilting of the assembly and to restore the assembly to its original position.

The foregoing objects and other objects which will be apparent from time to time are now realized by the invention which will be described in detail and which is illustrated in the accompanying drawings wherein:

FIGURE 1 is a perspective view of the assembled troughing idler assembly,

FIGURE 2 is a side view, partially in cross section, of the assembly,

FIGURE 3 is a view taken along lines 3—3 of FIGURE 2,

FIGURE 4 is a view taken along lines 4—4 of FIGURE 2, and

FIGURE 5 is an end view of the troughing idler assembly.

A plurality of troughing idler assemblies are set up in a conveyor system and are generally suspended between generally parallel wire ropes 11. The ropes are supported by spaced upright standards along the length of the conveyor system. The conveyor system also has return idler rollers spaced at a lower position. A conveying reach of an endless conveyor belt rides on the troughing idler assembly shown in FIGURE 1, and the return reach of the endless conveyor belt rides on the return idler roller. The supports, return roller and endless conveyor belt and other components of the conveyor system are not shown since such do not comprise a portion of this invention.

The troughing idler assembly of FIGURE 1 is shown with a fragment of the wire ropes 11 which comprise a portion of the conveyor system. The troughing idler assembly consists of rope clamps or elongated connectors 16 which engage the wire rope by having the curved mounting 17 engage said rope and having a suitable clamp 18 pressing against the underside of the wire rope 11. The pressing force is provided by a clamping screw 19. A crosspiece generally shown at 10 extends to the elongated connectors, and the ends of the crosspiece are shown as closed by supporting arms 12, 12.

The upper end of supporting arm 12 has a slot which serves to hold the outer ends of wing rollers 15, 15. The inner ends of the wing rollers are held by smaller brackets 14, 14. In similar manner, a center roller 2 is supported by brackets 13, 13.

The crosspiece 10 is yieldable in that it will tilt or give under an impact from a load on the conveying reach of the endless belt carried by the wing and center rollers. The crosspiece is preferably shaped as a downwardly open angle crosspiece or a crosspiece having diverging side walls 9 and 9a bent down over an imaginary center line as indicated by 8, all in FIGURE 3.

The crosspiece is shown as a preferably unitary piece consisting of the crosspiece member 10 and the supporting arms 12, 12 which close the ends of the crosspiece. This unit extends to elongated connectors 16, 16, and has a torque bar 20 positioned below the crosspiece and extending beyond the supporting arms into the adjoining elongated connectors.

The torque bar is generally round and is keyed into the crosspiece at an intermediate position by way of a connecting piece 7. The bar is also keyed into the side support frames at its end portions. One way to attain the foregoing keying relationship is to have opposed portions on the bar milled to form flat faces. A flat face on one side of the torque bar is shown at one end as at 21 and the other end as at 22. An intermediate portion of the torque bar is also milled on both sides to form flat faces as at 23. The flat faces 21 and 21a are shown at one end of the bar in FIGURE 4. FIGURE 4 also shows how the flat faces key into a straight wall slot 24 in the side support frame 16. This prevents the torque bar from turning in the side support frame. At the same time, the torque bar is free to twist in the bore 25 which is formed in the support plate 12.

It is thus seen that the bore or straight wall slot 24 in the elongated connector 16 and the bore or circular slot 25 in the support plate 12 form a common bore through which the end of the torque bar is inserted. The bore 25 is annular to permit the annular portion of the torque bar to freely rotate therein; but the bore 24 has straight sides which key the flat surfaces 21 and 21a of the torque bar to lock that end of the torque bar in the elongated connector 16.

Following a longitudinal impact from an overlying load, the crosspiece tends to tilt downstream and this tilting movement of the crosspiece is conveyed to the torque bar by means of the connecting plate 7 welded or secured by other means as at 6 to the diverging walls of the crosspiece. The connecting plate is slotted as at 5 to coact with the opposite flat surfaces 23 and 23a at its intermediate portion. Any tilting or yielding of the crosspiece from an overlying load is therefore conveyed to the torque bar which tends to initially twist with the crosspiece positioned above it, but such twisting is resisted by the ends of the torque bar which are keyed into the support plates 16.

The torque bar is biased or tensioned against twisting or downward displacement by one or more concavo-convex springs 30 which are also known as Belleville springs. The tension of the springs 30 is set by a nut as at 31 and the ends of the torque bar will be threaded as at 32 so the nut 31 can be set at different positions. The torque bar may be both twisted and displaced downwards from the impact of an overlying load; after the load is removed, the torque bar will resume its original position from its own resiliency and by the action of the concavo-convex spring washers.

The relationship of the various components in the troughing idler assembly may be additional viewed in FIGURE 5 wherein the upright plate support 12 is shown angled downstream. The diverging side walls of the crosspiece are shown in phantom outline, and the lowermost portion of the connecting plate 7 is shown extending below the side support frame. The arrows in FIGURE 1 and FIGURE 5 indicate the downstream direction of the conveyor system.

The use and operation of my invention are as follows:

In a troughing idler system for a wire rope sideframe conveyor, the problems associated with sudden loads and the impact of such loads on the assembly are always present. Such impacts present sudden stresses and forces which can damage an idler assembly or cause early damage and breakdown.

A heavy load riding on the endless belt conveyor which is carried by the idler rollers 15 will tend to twist or tilt the crosspiece downstream. The force of the longitudinal or downstream tilting of the crosspiece is transferred to the torque bar through a connecting plate 7 which is keyed into the torque bar along opposed flat faces 23 and 23a. The torque bar will twist from this load after it has overcome its own resiliency and the tension provided from the Belleville springs. The torque bar and the overlying crosspiece may also be displaced downward from the overlying load, and, again, this displacement will be initially resisted by the resiliency of the torque bar and the tension of the Belleville springs. The torque bar, of course, will not freely rotate in conjunction with the tilting or twisting of the crosspiece because the ends of said torque bar are keyed into coacting bores in the elongated connector 16.

The resiliency of the torque bar and the tension of the Belleville springs will return the torque bar, and the overlying crosspiece keyed thereto, to its original position. It is thus seen that the troughing idler assembly herein will yield or tilt with sudden heavy impacts received from overlying loads, therefore, damage or early breakdown to the troughing idler assembly is greatly reduced.

It will be understood that the yieldable crosspiece of the assembly need not be restricted to the particular downward open angle member described. Equivalent yieldable crosspieces will operate so long as such crosspiece is keyed into the torque bar located at a lower position. It will be further appreciated that torque bars of other manufacture and configuration may be suitably joined to the idler assembly disclosed herein so long as such torque bar has an inherent resiliency and is keyed into the support frames or equivalent structures along the flexible wire rope conveyor system. The Belleville or concavo-convex springs disclosed here are meant to illustrate how the torque bar is biased against displacement but, again, it will be appreciated that equivalent bias means may be employed to provide tension against displacement of the torque bar both downwardly and against a twisting action.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A yieldable troughing idler assembly for a wire rope sideframe conveyor which includes, in combination,
   support means at each side of the assembly,
   a yieldable crosspiece connecting said side supports,
   a plurality of idler rollers associated with said crosspiece,
   a torque bar positioned below the top of said crosspiece and extending to each of said side support means, each end of said torque bar keyed into one of said support means,
   a torque transmitting member securely fixed to the crosspiece at an intermediate position and keyed into said torque bar,
   whereby downstream tilting of the idler assembly is resisted by the twisting torque bar.

2. The assembly of claim 1 further characterized by and including an upright supporting arm between the end of the crosspiece and each rope clamping means.

3. The assembly of claim 1 further characterized in that the crosspiece is an angular member having diverging side walls.

4. A troughing idler assembly according to claim 1 further characterized in that the torque transmitting member has a slot which coacts with opposed flat faces in the torque bar.

5. The assembly of claim 1 further characterized in that the torque bar has a circular cross section generally along the length thereof, and the end of the bar along with an intermediate portion are provided with opposed flat faces, which key into coacting slots.

6. A troughing idler assembly according to claim 1 further characterized by and including biased means at the ends of the torque bar working against displacement of said torque bar.

7. A yieldable troughing idler assembly for a wire rope sideframe conveyor, which includes, in combination,
   elongated connectors to engage wire ropes,
   a crosspiece connecting said elongated connectors,
   a plurality of idler rollers associated with the crosspiece,
   a torque bar having opposed flat faces at each end keyed to the elongated connectors, and opposed flat faces in the bar intermediate said ends keyed to a slotted member connected to the crosspiece,
   whereby downstream tilting of the idler assembly is resisted by the twisting of the torque bar.

8. A yieldable troughing idler assembly for a wire rope sideframe conveyor which includes, in combination,
   elongated connectors adapted for engaging wire ropes,
   substantially upright supporting arms joined to said elongated connectors,
   a crosspiece extending to the supporting arms, said crosspiece turned down over a center line to form a pair of diverging side walls,
   a torque bar positioned below said crosspiece, each end and an intermediate portion of said torque bar having opposite flat faces, the end of said torque bar extending through an annular bore in the supporting arm and a slotted bore in the elongated connector, the torque bar biased outwards by concavo-convex springs,
   a transverse connecting plate secured to the diverging walls of the crosspiece intermediate its ends, and the bottom of the connecting plate slotted to engage the flat faces in the intermediate portion of the torque bar,
   whereby tilting of the idler assembly from downstream impact is resisted by twisting of the torque bar.

9. A yieldable troughing idler assembly for a wire rope sideframe conveyor which includes, in combination,
   support means at each side of the assembly, a yieldable crosspiece connecting said side supports,
   a plurality of idler rollers associated with said crosspiece,
   a torque bar positioned below the top of said crosspiece and extending to each of said side support means,
   each end of said torque bar fixed to one of said support means,
   and a torque transmitting member securely fixed to the torque bar and to the crosspiece at an intermediate position,
   whereby downstream tilting of the idler assembly is resisted by the twisting torque bar.

No references cited.